US011970363B2

(12) United States Patent
Weibel et al.

(10) Patent No.: US 11,970,363 B2
(45) Date of Patent: Apr. 30, 2024

(54) ELEVATOR CAR FOR A DOUBLE-DECK ELEVATOR

(71) Applicant: Inventio AG, Hergiswil (CH)

(72) Inventors: André Weibel, Ballwil (CH); Stefan Weber, Niederwil (CH)

(73) Assignee: INVENTIO AG, Hergiswil (CH)

(*) Notice: Subject to any disclaimer, the term of this patent is extended or adjusted under 35 U.S.C. 154(b) by 0 days.

(21) Appl. No.: 17/754,066

(22) PCT Filed: Sep. 1, 2020

(86) PCT No.: PCT/EP2020/074271

§ 371 (c)(1),
(2) Date: Mar. 23, 2022

(87) PCT Pub. No.: WO2021/063611

PCT Pub. Date: Apr. 8, 2021

(65) Prior Publication Data

US 2022/0332545 A1 Oct. 20, 2022

(30) Foreign Application Priority Data

Sep. 30, 2019 (EP) .................................... 19200463

(51) Int. Cl.
*B66B 11/02* (2006.01)

(52) U.S. Cl.
CPC .................................. *B66B 11/022* (2013.01)

(58) Field of Classification Search
CPC ............... B66B 11/022; B66B 11/0213; B66B 11/0095; B66B 11/0206; B66B 11/02;
(Continued)

(56) References Cited

U.S. PATENT DOCUMENTS 5,907,136 A * 5/1999 Hongo ................ B66B 11/0095 187/277
7,017,714 B2 * 3/2006 Fujita ...................... B66B 1/425 187/401

(Continued)

FOREIGN PATENT DOCUMENTS

EP 0933323 A1 * 8/1999
EP 2468674 A1 6/2012

(Continued)

*Primary Examiner* — Michael R Mansen
*Assistant Examiner* — Michelle M Lantrip
(74) *Attorney, Agent, or Firm* — William J. Clemens; Shumaker, Loop & Kendrick, LLP

(57) ABSTRACT

A double-deck elevator car has first and second vertically spaced cars each accessible via a different floor in a stop position, a car frame with at least one longitudinal support, a first support structure in the frame supporting the first car, a second support structure in the frame supporting the second car, and a linear guide movably coupling the first support structure to the longitudinal support. The linear guide has at least one rail element fastened to the longitudinal support, and at least one coupling element slidably mounted on the rail element and fastened to the first support structure. The coupling element has first and second mounting portions mounting on the rail element and a fastening portion fastening the coupling element to the first support structure. A drive moves the first support structure relative to the second support structure.

17 Claims, 4 Drawing Sheets

(58) Field of Classification Search
CPC ........... B66B 1/425; B66B 7/04; B66B 7/047; B66B 7/042; B66B 7/022
See application file for complete search history.

(56) References Cited

U.S. PATENT DOCUMENTS

| | | | | |
|---|---|---|---|---|
| 9,038,780 | B2 * | 5/2015 | Drew | B66B 5/20 187/245 |
| 9,102,502 | B2 * | 8/2015 | Yamada | B66B 11/022 |
| 11,332,344 | B2 * | 5/2022 | Ericson | B66B 11/0213 |
| 2005/0217941 | A1 * | 10/2005 | Strebel | B66B 11/022 187/249 |
| 2006/0231350 | A1 * | 10/2006 | Hashiguchi | B66B 11/0206 187/401 |

FOREIGN PATENT DOCUMENTS

| | | | | | |
|---|---|---|---|---|---|
| JP | H0472288 | A | | 3/1992 | |
| JP | 2000344448 | A | * | 12/2000 | B66B 1/42 |
| JP | 2010228922 | A | * | 10/2010 | |
| JP | 5325753 | B2 | * | 10/2013 | |
| WO | WO-2007125595 | A1 | * | 11/2007 | B66B 1/425 |

* cited by examiner

ELEVATOR CAR FOR A DOUBLE-DECK ELEVATOR

FIELD

The present invention relates to an elevator car for a double-deck elevator, to a double-deck elevator comprising such an elevator car and to a method for controlling such a double-deck elevator.

BACKGROUND

In order to transport people or loads in general between different floors or height levels, double-deck elevators, sometimes also referred to as double-decker elevators, can be used in addition to ordinary single-car elevators. A double-deck elevator is characterized by an elevator car having two cars which are arranged one above the other and are usually rigidly interconnected. This means that two floors can be approached at the same time.

In order to enable the use of double-deck elevators in buildings with different floor heights, the two cars can be interconnected, for example via screw spindle drives or scissor-like connecting links. In this case, a distance between the cars can be adjusted to a floor distance between the two floors to be approached by means of a control system during the journey.

One of the challenges in the design of such double-deck elevators is to make components for guiding and driving a car to be moved as light, space-saving and cost-efficient as possible.

SUMMARY

There may be a need, inter alia, for an elevator car for a double-deck elevator which makes it possible to adjust a distance between an upper car and a lower car using a more compact and lighter guide and drive means and a larger number of standard parts that are inexpensive to provide. Furthermore, there may be a need for a corresponding double-deck elevator and for a corresponding method for controlling a double-deck elevator.

A need of this kind can be met by the subject matter according to any of the advantageous embodiments that are defined in the following description.

A first aspect of the invention relates to an elevator car for a double-deck elevator. In the operational state, the elevator car can have two cars arranged one above the other. Furthermore, the cars can each be accessible via a different floor when the elevator car is in a stop position. The elevator car has: an elevator car frame having at least one longitudinal support extending in the longitudinal direction of the elevator car frame; a first support structure arranged in the elevator car frame for supporting a first of the cars; a second support structure arranged in the elevator car frame for supporting a second of the cars; a linear guide means which is designed to movably couple at least the first support structure to the longitudinal support so that the first support structure can be moved along the longitudinal support relative to the second support structure; and a drive means which is designed to move at least the first support structure relative to the second support structure.

Furthermore, the linear guide means has: at least one rail element which is fastened to the longitudinal support, and at least one coupling element which, on the one hand, is slidably mounted on the rail element and, on the other hand, is fastened to the first support structure. Furthermore, the coupling element has: a first mounting portion and a second mounting portion for mounting the coupling element on the rail element, and a fastening portion arranged between the first mounting portion and the second mounting portion for fastening the coupling element to the first support structure, wherein, in the operational state of the elevator car, the first mounting portion is arranged above the first support structure and/or the second mounting portion is arranged below the first support structure.

A second aspect of the invention relates to a double-deck elevator which has: an elevator car according to one embodiment of the first aspect of the invention; and a control device which is designed to control the drive means of the elector car on the basis of a floor distance between two floors to be approached at the same time. In other words, the drive means can be controlled in such a way that a vertical distance between the first support structure and the second support structure is adapted to the floor distance.

A third aspect of the invention relates to a method for controlling a double-deck elevator according to one embodiment of the second aspect of the invention. The method comprises: receiving floor information regarding two floors to be approached at the same time; evaluating the floor information and determining a floor distance between the two floors to be approached at the same time; and issuing a control command for controlling the drive means of the elevator car on the basis of the floor distance.

Possible features and advantages of embodiments of the invention can be considered, inter alia and without limiting the invention, to be based upon the concepts and findings described below.

As indicated at the outset, it may be necessary to adjust a vertical car distance between two cars of a double-deck elevator due to the unequal floor distances between different floors of a building. In order to move a car to be adjusted in a corresponding manner, a guide is usually required within an elevator car in which the two cars are arranged one above the other. Depending on the type of drive selected, it is desirable if the guide is as rigid as possible. In particular, the guide should ensure that no or at least only very low horizontal forces act on a drive shaft, for example a threaded spindle or the like, in order not to shorten the service life of bearings and to keep energy consumption as low as possible.

On the other hand, the size of the elevator shaft, in particular its cross-sectional area (footprint), plays an important role in the design of an elevator system. In order not to have to additionally enlarge the elevator shaft, the guide should have the smallest possible space requirement, in particular in the horizontal direction. The individual components of the guide should therefore be kept as compact as possible.

Another requirement to be considered is the speed at which the car distance between two stop positions can be adjusted. This should be high enough so that the cars can be brought into the correct position in good time, in particular before stopping, i.e. into a position in which the door sills of the cars are at the same height as the corresponding door sills of the two floors approached.

In order to take account of these requirements, the approach presented here proposes using elements of an elevator car frame, such as lateral supports of a central frame, for linear guidance of a car to be moved. Thus, on the one hand, the number of additional components can be reduced. On the other hand, due to the high rigidity of the elevator car frame, more compact components can be used for the guide, so that the space requirement in the horizontal direction can be reduced. Despite the more compact components, the guide can be designed with a sufficiently high degree of rigidity by attaching it to load-bearing elements of the elevator car frame. This can protect the drive and reduce friction losses.

An elevator car can generally be understood as a frame that can be moved between multiple levels or floors, for example in an elevator shaft, with at least one car for transporting people or loads. In the case of a double-deck elevator, the elevator car can comprise two double-deck cars for approaching two different floors at the same time.

An elevator car frame can be understood as a frame-like construction for supporting the cars, also referred to as a catch frame. The elevator car frame can be designed, for example, to guide the elevator car along at least one guide rail extending in an elevator shaft. Such guide rails can be arranged on one side or on two opposite sides in the elevator shaft. If the guide rail is arranged on one side, the elevator car frame can be designed as an L-shaped backpack frame, for example. If the guide rails are arranged on both sides, the elevator car frame can be designed as a central frame, for example. The cars sit in the elevator car frame or, in other words, are at least largely framed by it. A safety gear can also be integrated into the elevator car frame, and is used to brake the elevator car in case of excess speed.

A longitudinal direction of the elevator car frame can be understood to mean a direction of the longest extension of the elevator car frame. In the operational state of the elevator car, the longitudinal direction of the elevator car frame can be a vertical direction. In this sense, the longitudinal direction of the elevator car frame can be considered to coincide with a direction of travel of the elevator car.

A longitudinal support can be understood to mean a component for carrying in particular vertical loads, and the extension of this support in the longitudinal direction of the elevator car frame is significantly greater than in the transverse direction of the elevator car frame. In the operational state of the elevator car, the longitudinal support can extend substantially vertically. The longitudinal support can also be used, for example, to guide the elevator car on one or more guide rails in the elevator shaft. Depending on the design, the longitudinal support can extend over the entire height of the elevator car frame or only along a portion of the elevator car frame. In particular, the longitudinal support can be designed to couple the first support structure and the second support structure to one another. The longitudinal support can be designed, for example, as a steel beam having a closed (hollow) profile or an open profile.

For example, the elevator car frame can also have multiple longitudinal supports which can be arranged in pairs next to one another and/or in pairs opposite one another and/or can extend substantially in parallel with one another.

A support structure can generally be understood to be a platform or a deck for receiving a car, for example in the form of a support frame. For example, the car can sit on the support structure in the operational state of the elevator car. It is also conceivable that the car is suspended from the support structure when the elevator car is in an operational state. The car can be connected to the support structure in a vibration-damping manner. In the simplest case, the support structure can comprise four supports which are interconnected to form a rectangle or square. The first support structure and the second support structure can be arranged one above the other in the elevator car frame. Depending on the space required by the linear guide means, the first support structure can have a smaller surface area than the second support structure for a given size of the elevator shaft. Accordingly, the first car can have a smaller surface area than the second car. However, it is also possible for the first support structure and the second support structure or the first car and the second car to be structurally identical. Furthermore, the elevator car frame can have, for example, a lower (floor) frame and an upper (ceiling) frame, which can be interconnected via one or more longitudinal supports. The first support structure and the second support structure can be arranged between the lower frame and the upper frame. Between the first support structure and the second support structure, for example, at least one intermediate structure, such as an intermediate frame, can be arranged for additional reinforcement of the elevator car frame.

The second support structure can be rigidly connected to the elevator car frame, for example to one or more longitudinal supports. In this case, only the first support structure can be moved relative to the elevator car frame, thereby varying a vertical distance between the two support structures, while the second support structure is fixed relative to the elevator car frame. However, it is also possible that, in addition to the first support structure, the second support structure is movably coupled to at least one longitudinal support by means of the linear guide means. In this case, a vertical distance between the two support structures can be adjusted, for example, by moving the support structures at the same time.

A linear guide means can generally be understood to mean a straight guide, for example a profile rail or roller guide. For example, the linear guide means can comprise a sliding guide, a rolling guide and/or a magnetic guide. The first support structure can be guided vertically during the movement by means of the linear guide means.

A drive means can generally be understood to mean a linear drive by means of which the first support structure or, additionally, the second support structure can be raised and/or lowered. For example, the drive means can comprise a spindle drive and/or a hydraulic and/or pneumatic linear drive.

Depending on the design, the rail element can be fastened to a single longitudinal support or to multiple longitudinal supports at the same time. The rail element can expediently extend in the longitudinal direction of the relevant longitudinal support in order to guide the first support structure linearly along the longitudinal support, i.e. in the vertical direction. It is also possible for more than one rail element to be fastened to a longitudinal support, for example.

The coupling element can be a guide shoe, guide carriage or guide slide, for example. For example, the coupling element can be slidably mounted on at least two mutually parallel rail elements. The longitudinal supports can thus be used advantageously in order to increase the rigidity of the linear guide means, in particular transversely to a direction of travel of the first support structure.

A mounting portion can be understood to mean a portion of the coupling element in which at least one guide element, for example a sliding guide shoe, is arranged for coupling to at least one rail element. In the fastening portion, the coupling element can be screwed and/or welded to the first support structure, for example. For example, a vertical distance between the first mounting portion and the second mounting portion can be at least 50 cm. The vertical distance can be understood as a support distance between the two mounting portions, for example. This allows for relatively rigid mounting, which is well suited for providing support against tilting moments.

The linear guide means can in particular be designed as a sliding guide. The sliding guide can be, for example, a hydrodynamic sliding guide with a metal-metal or metalplastic pairing, or a hydrostatic sliding guide. A high load-bearing capacity and a high rigidity of the linear guide means, along with very good damping behavior and high operational reliability, can thus be achieved.

According to one embodiment, the coupling element can be designed as a frame. Additionally or alternatively, the coupling element can have at least one U- and/or C-shaped profile. In the simplest case, the coupling element can be, for example, a single profile, such as a longitudinal profile, which is fastened to the first support structure and to which suitable guide elements for guidance on one or more rail elements are fastened. It is also possible for the coupling element to be constructed from multiple support elements, for example from two longitudinal profiles and two transverse profiles, which are combined to form a frame. This embodiment makes it possible to construct the coupling element inexpensively from standard parts with high rigidity and low weight.

According to one embodiment, at least one of the two mounting portions or, additionally or alternatively, the fastening portion can be integrated into the U- and/or C-shaped profile. In other words, guide elements such as sliding guide shoes arranged in the first or second mounting portion or fastening elements such as screws arranged in the fastening portion can be completely recessed in the U- and/or C-shaped profile. As a result, the coupling element can be designed with the lowest possible structural height.

According to one embodiment, the coupling element can have at least two U- and/or C-shaped longitudinal profiles extending in the longitudinal direction of the elevator car frame. At least one of the two mounting portions or, additionally or alternatively, the fastening portion can be integrated into the longitudinal profiles. The longitudinal profiles can, for example, be directly interconnected, for example by means of screws, rivets or a welded connection. It is also possible for the longitudinal profiles to be interconnected via at least one intermediate element, for example one or more transverse profiles.

According to one embodiment, the coupling element can have at least two transverse profiles. The longitudinal profiles can be connected to the transverse profiles to form a frame. This can increase the torsional stiffness of the coupling element.

According to one embodiment, the longitudinal profiles can each have at least one upper sliding guide shoe arranged in the first mounting portion and at least one lower sliding guide shoe arranged in the second mounting portion for being guided on the rail element. A sliding guide shoe can be understood to mean a guide element that slides on the rail element and is guided along the rail element. For example, the sliding guide shoe can be implemented as a U- or C-shaped profile with an insert made of a friction-reducing material. This embodiment makes it possible to achieve particularly stable mounting of the first support structure in the elevator car frame.

According to one embodiment, the elevator car frame can have at least two longitudinal supports extending in the longitudinal direction of the elevator car frame. The first support structure can be arranged between the longitudinal supports. Accordingly, the linear guide means can have: at least two rail elements which are each fastened to a different longitudinal support, and at least two coupling elements, which are fastened to opposite sides of the first support structure and are each movably coupled to a rail element. The rail elements can be arranged on opposite sides of the longitudinal supports. This ensures that the first support structure is guided on both sides and is therefore particularly stable.

According to one embodiment, the elevator car frame can have at least four longitudinal supports extending in the longitudinal direction of the elevator car frame. The longitudinal supports can be arranged in at least two opposing pairs of longitudinal supports. The first support structure can be arranged between the pairs of longitudinal supports. For example, at least one of the pairs of longitudinal supports can be designed to be guided on one or more guide rails located in the elevator shaft. It is possible, for example, that, in the operational state of the elevator car, a guide rail is passed between two appropriately spaced longitudinal supports of a pair of longitudinal supports in order to guide the elevator car along the elevator shaft. Accordingly, the linear guide means can have: at least four rail elements which are each fastened to a different longitudinal support, and at least two coupling elements, which are fastened to opposite sides of the first support structure and are each movably coupled to two rail elements. As with the longitudinal supports, the rail elements can be arranged opposite one another in pairs. Thus, the first support structure can be arranged between two pairs of rail elements and can be movably coupled on both sides via a coupling element in each case with two rail elements which are parallel, for example. By using at least four longitudinal supports, the load on individual longitudinal supports can be reduced compared to an embodiment with fewer than four longitudinal supports. As a result, the longitudinal supports can be made comparatively smaller.

According to one embodiment, the linear guide means can comprise at least one car guide element. In the operational state of the elevator car, the car guide element can movably couple the first car to at least one longitudinal support so that the first car is guided along the longitudinal support when the first support structure is moved. The car guide element can be a sliding guide shoe, for example. The car guide element can be slidably mounted on at least one of the rail elements, for example. In particular, the car guide element can be arranged, for example, in the region of a ceiling of the first car, such as in a lateral outer portion of the first car. This has the advantage that tilting movements of the first car can be avoided when the first support structure is moved.

According to one embodiment, the first support structure can be arranged so as to support a lower car. Additionally or alternatively, the second support structure can be arranged so as to support an upper car. In other words, the vertical distance between the lower car and the upper car can be adjusted by moving the lower support structure. This has the advantage that the linear guide means and the drive means can be integrated into the elevator car in a space-saving manner with relatively little constructive effort.

According to one embodiment, the drive means can be designed to apply a lifting force to two diametrically opposed corner portions of the first support structure. Two diametrically opposed corner portions can be understood to mean two corner portions of the first support structure, each of which lies on a diagonal of the first support structure. A lifting force can be understood to mean a force for raising and/or lowering the first support structure. This embodiment can minimize twisting of the first support structure due to loads during travel. In addition, this embodiment allows a space-saving arrangement of the drive means in the elevator car frame.

According to one embodiment, the drive means can comprise: at least one threaded spindle, at least one threaded nut slidably mounted on the threaded spindle and fastened to the first support structure, and at least one drive unit for driving the threaded spindle. Optionally, the threaded spindle can be rotatably mounted on a longitudinal support of the elevator car frame. For example, the drive means can comprise two threaded spindles, each having a threaded nut, it being possible for the threaded nuts to be attached to different portions of the first support structure, for example to diametrically opposed corner portions of the first support structure. The threaded spindles can be driven via separate drive units, for example. This embodiment allows the drive means to be realized with a relatively small space requirement and a relatively low weight.

Embodiments of the invention will be described below with reference to the accompanying drawings; neither the drawings nor the description is intended to be interpreted as limiting the invention.

The drawings are merely schematic and not to scale. Like reference signs denote like or equivalent features in the various drawings.

DETAILED DESCRIPTION

Figure 1:
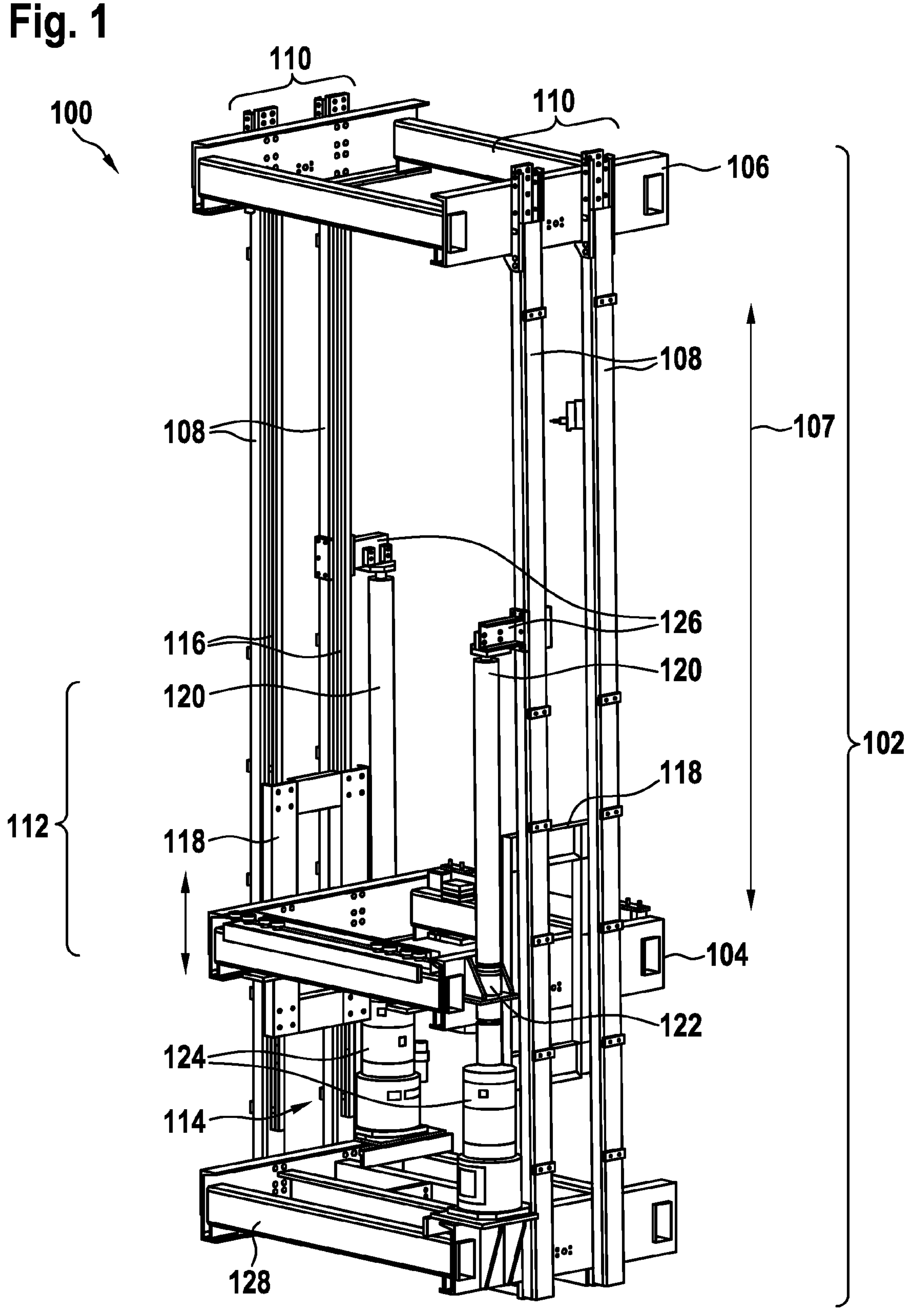
FIG. 1 shows a portion of an elevator car according to one embodiment of the invention.

FIG. 1 shows a portion of an elevator car 100 according to one embodiment of the invention. The elevator car 100 comprises a double-deck elevator car frame 102 having a first support structure 104 for supporting a first car and a second support structure 106 for supporting a second car. For better visibility, only a lower portion of the elevator car 100 or the elevator car frame 102 is shown in FIG. 1. The two support structures 104, 106 are, for example, interconnected to form a closed frame, also referred to as the central frame, via a total of four longitudinal supports 108 extending in a longitudinal direction 107 of the elevator car frame 102. In this case, two longitudinal supports 108 are combined to form a pair of longitudinal supports 110. The two pairs of longitudinal supports 110 are arranged opposite one another on the two support structures 104, 106, i.e. the two support structures 104, 106 are each located between the two pairs of longitudinal supports 110. The second support structure 106, in this case an upper support structure, is rigidly connected, for example screwed, to the longitudinal supports 108, while the first support structure 104, in this case a lower support structure, is movably coupled to the four longitudinal supports 108 via a linear guide means 112. The linear guide means 112 is designed to guide the first support structure 104 along the longitudinal supports 108, that is to say vertically, so that the first support structure 104 is slidable relative to the second support structure 106.

Furthermore, the elevator car 100 comprises a drive means 114 which is designed to apply a lifting force to the first support structure 104 relative to the second support structure 106. Thus, the first support structure 104 can be raised or lowered in the vertical direction with respect to the second support structure 106, for example depending on a particular floor distance between two floors to be approached.

Corresponding to the arrangement of the longitudinal supports 108, the linear guide means 112 according to this embodiment comprises a sliding guide having a total of four rail elements 116, for example profile rails, which are each fastened to one of the four longitudinal supports 108 and each extend along the four longitudinal supports 108. The rail elements 116 are thus arranged in pairs similarly to the longitudinal supports 108 and extend in parallel with one another.

Furthermore, the linear guide means 112 comprises two coupling elements 118 which are designed to movably couple the rail elements 116 to the first support structure 104. The two coupling elements 118 are arranged on opposite sides of the first support structure 104 and are screwed thereto, for example. In addition, the two coupling elements 118 are each slidably mounted on two rail elements 116 arranged next to one another in pairs. The first support structure 104 is thus movably coupled on both sides to the elevator car frame 102, more precisely to the longitudinal supports 108.

As can be seen in FIG. 1, the two coupling elements 118 each have a significantly smaller width than the first support structure 104. It can also be seen that the two coupling elements 118 are very flat so that they can be arranged between the longitudinal supports 108 and the first support structure 104 without having to significantly reduce the size of the first support structure 104 and/or significantly increase the cross-sectional area of the elevator shaft in which the elevator car 100 is to be installed.

As shown in FIG. 1, the drive means 114 comprises, for example, two threaded spindles 120, on each of which a threaded nut 122 is arranged so as to be slidable in the longitudinal direction of the longitudinal supports 108. The threaded nuts 122 are each fastened to the first support structure 104, for example screwed thereto. Furthermore, the drive means 114 comprises two separate drive units 124 which are each designed to set one of the two threaded spindles 120 in a rotational movement and thereby move the threaded nuts 122 in the longitudinal direction of the longitudinal supports 108. In addition, the drive means 114 has two mounting units 126 which are each designed to rotatably mount one of the threaded spindles 120 on one of the longitudinal supports 108.

As can be seen in FIG. 1, the threaded nuts 122 can be attached to diametrically opposed corner portions of the first support structure 104, so that the lifting force is introduced at these corner portions.

The drive means 114 sits, for example, on a floor frame 128 which is rigidly connected to the four longitudinal supports 108, for example screwed thereto. The first support structure 104 is arranged between the floor frame 128 and the second support structure 106. In addition to the floor frame 128, the elevator car 100 can have a ceiling frame rigidly connected to the four longitudinal supports 108 for further stabilization, it being possible for the second support structure 106 to be arranged between the first support structure 104 and the ceiling frame. In addition to the mounting units 126, the floor frame 128 is used to absorb reaction forces when the lifting force is applied to the first support structure 104.

A drive means 114 comprising pneumatic and/or hydraulic drive units is also possible.

Alternatively, the elevator car frame 102 can also be designed with only two instead of four longitudinal supports

108. In this case, the two longitudinal supports 108 can be dimensioned so as to be correspondingly larger in order to ensure sufficient stability of the elevator car frame 102. The linear guidance of the first support structure 104 in the elevator car frame 102 can take place analogously to the embodiment described above with four longitudinal supports 108.

Depending on the load on the elevator car 100, it is also possible to arrange the longitudinal supports 108 on one side and thus guide the first support structure 104 in the elevator car frame 102 on one side.

Figure 2:
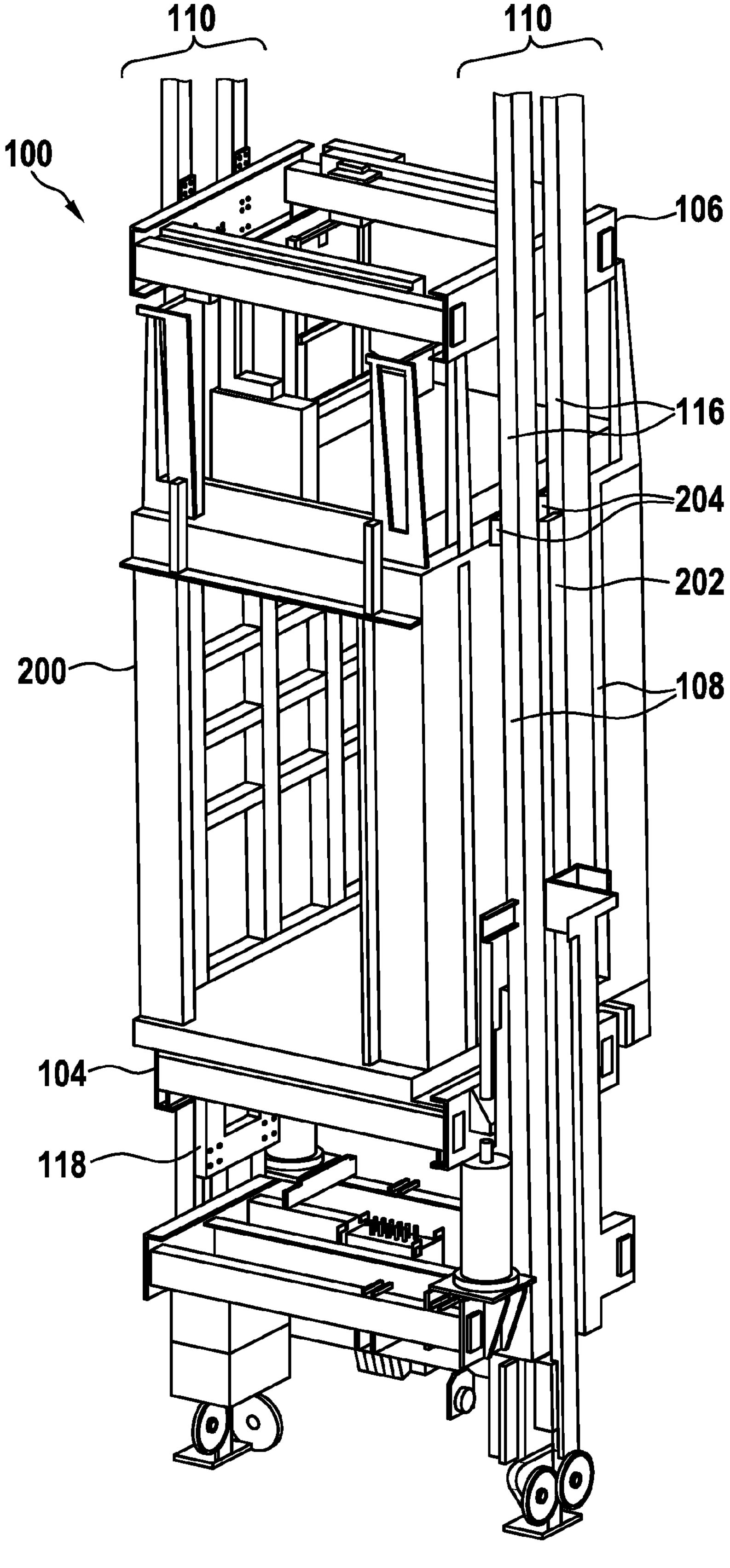
FIG. 2 shows the elevator car from FIG. 1 with the lower car installed.

FIG. 2 shows the elevator car 100 from FIG. 1 with the lower car 200 installed. The lower car 200 sits on the first support structure 104. For better visibility, the upper support structure 106, which forms an upper deck of the elevator car 100, is shown without an upper car.

In this example, the two pairs of longitudinal supports 110 are arranged so as to each receive a guide rail 202 for guiding the elevator car 100 in an elevator shaft. The guide rail 202 can be guided centrally between two longitudinal supports 108 of a pair of longitudinal supports 110.

In addition, the elevator car 100 comprises, for example, four car guide elements 204 which are arranged opposite one another in pairs at an upper end of the lower car 200 facing the second support structure 106 and are guided on the rail elements 116. The car guide elements 204 are designed as sliding guide shoes, for example.

Figure 3:
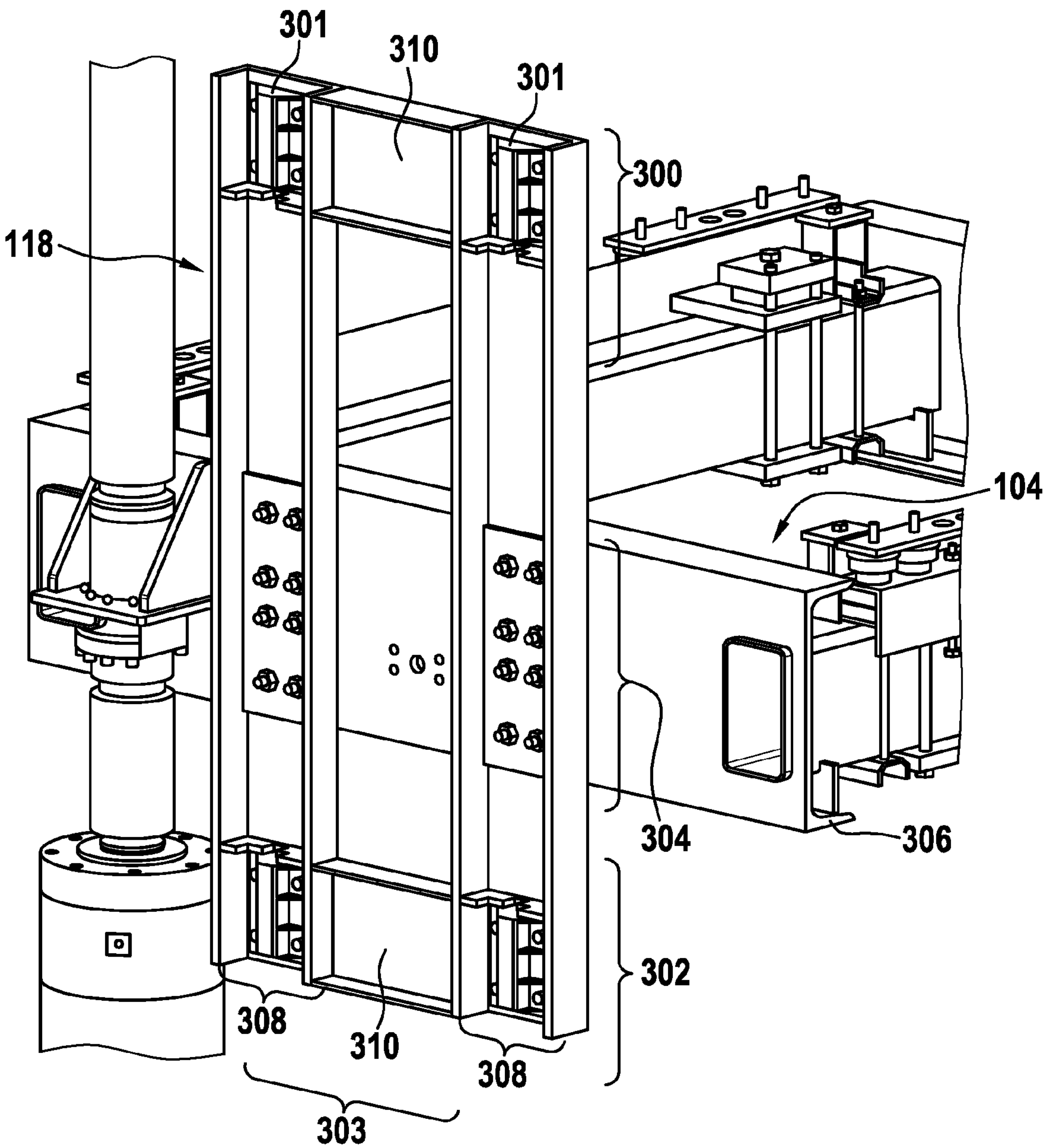
FIG. 3 shows an enlarged view of a coupling element from FIGS. 1 and 2.

FIG. 3 shows an enlarged view of a coupling element 118 from FIGS. 1 and 2. According to this embodiment, the coupling element 118 is designed as a rectangular frame comprising an upper mounting portion 300 located above the first support structure 104 with two upper sliding guide shoes 301 and a lower mounting portion 302 located below the first support structure 104 with two lower sliding guide shoes 303. Between the two mounting portions 300, 302, the coupling element 118 has a fastening portion 304 at which the coupling element 118 is screwed to a transverse support 306 of the first support structure 104. The upper sliding guide shoe 301 and the lower sliding guide shoe 303 are used to guide the coupling element 118 on two parallel rail elements 116.

As can be seen in FIG. 3, the coupling element 118 can for example be constructed very simply from two vertical U-profiles 308 and two horizontal U-profiles 310. The sliding guide shoes 301, 303 can be arranged in the vertical U-profiles 310 to save space. Likewise, the coupling element 118 can be fastened to the first support structure 104 via the vertical U-profiles 308, for example screwed thereto.

Figure 4:
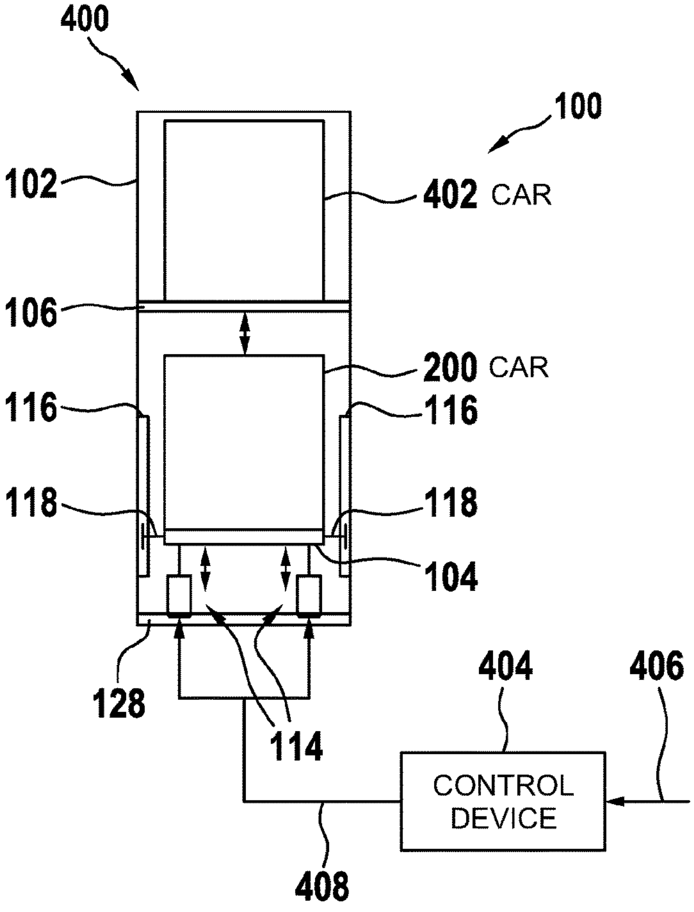
FIG. 4 shows a double-deck elevator according to one embodiment of the invention.

FIG. 4 shows a double-deck elevator 400 according to one embodiment of the invention. The double-deck elevator 400 comprises, for example, the elevator car 100 as described above with reference to FIGS. 1 and 2. An operational state of the elevator car 100 is shown, in which an upper car 402 is integrated in addition to the lower car 200. The upper car 402 sits on the second support structure 106. Furthermore, the double-deck elevator 400 comprises a control device 404 which is designed to control the drive means 114 in such a way that a vertical distance between the two cars 200, 402 is adjusted to a floor distance between two floors to be approached at the same time. For this purpose, the control device 404 receives floor information 406 which, in accordance with a stop request from an elevator user, specifies at which two floors the elevator should stop next at the same time. Using the floor information 406, the control device 404 determines the floor distance between the two floors to be approached, for example by retrieving a corresponding value from a table stored in the control device 404. Finally, on the basis of the floor distance, the control device 404 generates a control command 408 for the corresponding control of the drive means 114.

Figure 5:
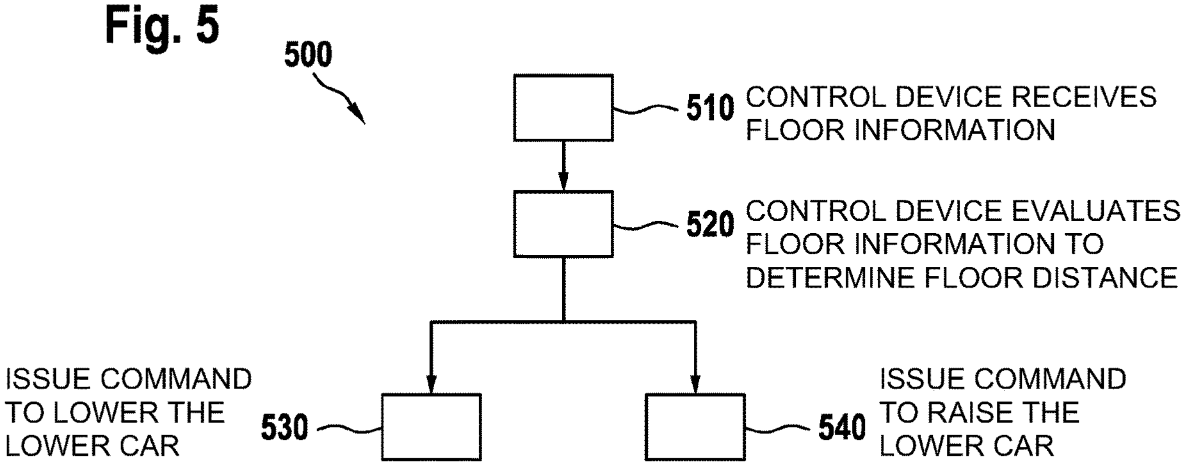
FIG. 5 shows a flow chart for a method for controlling the double-deck elevator from FIG. 4.

FIG. 5 shows a flowchart for a method 500 for controlling the double-deck elevator 400 from FIG. 4. In this case, in a first step 510, the floor information 406 is received in the control device 404. In a second step 520, the floor information 406 is evaluated by the control unit 404 in order to determine the floor distance between the two floors to be approached. For example, it is checked whether the determined floor distance is greater or smaller than a previously determined floor distance. If the determined floor distance is greater than a previously determined floor distance, in a step 530 the control command 408 is issued to lower the lower car 200 relative to the upper car 402 according to a difference between the determined floor distance and the previously determined floor distance. If the determined floor distance is smaller than the previously determined floor distance, in a step 540 the control command 408 is issued to raise the lower car 200 relative to the upper car 402 according to a difference between the determined floor distance and the previously determined floor distance.

The arrangement of four longitudinal supports 108 shown in FIGS. 1 and 2 is particularly suitable for heavy-duty elevators for transporting loads of more than 10 metric tons. The use of four instead of two longitudinal supports 108 reduces the individual load on the longitudinal supports 108. Accordingly, the size of the longitudinal supports 108 can be reduced.

The rail elements 116 can advantageously be used to reinforce the longitudinal supports 108. For this purpose, the rail elements 116 are connected directly to the longitudinal supports 108. In addition, the rail elements 116 can be designed, for example, with a particularly rigid profile shape. Conversely, the longitudinal supports 108 can advantageously be used to reinforce the rail elements 116.

The horizontal space requirement for the coupling element 118 can in particular be reduced to a minimum by inserting the sliding guide shoes 301, 303, as shown in FIG. 3, each in a U- or C-profile, which can be a load-bearing component of the coupling element 118.

Finally, it should be noted that terms such as "comprising," "having," etc. do not preclude other elements or steps, and terms such as "a" or "an" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator car for a double-deck elevator, wherein the elevator car has two cars arranged one above the other, wherein the cars are each accessible via a different floor in a stop position of the elevator car, the elevator car comprising:

- an elevator car frame having a longitudinal support extending in a longitudinal direction of the elevator car frame;
- a first support structure arranged in the elevator car frame supporting a first of the cars;
- a second support structure arranged in the elevator car frame supporting a second of the cars, where the second support structure and the second of the cars are fixed relative to the longitudinal support;

a linear guide means movably coupling the first support structure to the longitudinal support wherein the first support structure is moveable along the longitudinal support relative to the second support structure;

wherein the linear guide means has a rail element fastened to the longitudinal support and has a coupling element slidably mounted on the rail element and fastened to the first support structure;

wherein the coupling element has a first mounting portion and a second mounting portion mounting the coupling element on the rail element, the coupling element has a fastening portion arranged between the first mounting portion and the second mounting portion and fastening the coupling element to the first support structure, wherein, in an operational state of the elevator car, the first mounting portion is arranged above the first support structure and the second mounting portion is arranged below the first support structure; and a drive means moving the first support structure relative to the second support structure.

2. The elevator car according to claim 1 wherein the coupling element is formed as a rectangular frame.

3. The elevator car according to claim 1 wherein at least one of the first mounting portion, the second mounting portion and the fastening portion is a U-shaped profile or a C-shaped profile.

4. The elevator car according to claim 1 wherein the coupling element has at least two U-shaped vertical profiles or C-shaped vertical profiles extending in the longitudinal direction of the elevator car frame, and wherein at least one of the first mounting portion, the second mounting portion and the fastening portion is integrated into the vertical profiles.

5. The elevator car according to claim 4 wherein the coupling element has two horizontal profiles and the vertical profiles are connected to the horizontal profiles to form a frame.

6. The elevator car according to claim 4 wherein the vertical profiles each have an upper sliding guide shoe arranged in the first mounting portion and a lower sliding guide shoe arranged in the second mounting portion for guiding the coupling element on the rail element.

7. The elevator car according to claim 1 wherein the elevator car frame has at least two of the longitudinal support extending in the longitudinal direction of the elevator car frame, the first support structure being arranged between the at least two longitudinal supports, and wherein the linear guide means has at least two of the rail element each being fastened to a different one of the at least two longitudinal supports and the linear guide means has at least two of the coupling element fastened to opposite sides of the first support structure and each being movably coupled to one of at least two rail elements.

8. The elevator car according to claim 1 wherein the elevator car frame has four of the longitudinal support extending in the longitudinal direction of the elevator car frame, the longitudinal supports being arranged in two opposing pairs, wherein the first support structure is arranged between the pairs of longitudinal supports, and wherein the linear guide means has four of the rail element each fastened to a different one of the longitudinal supports and the linear guide means has two of the coupling element fastened to opposite sides of the first support structure and each being movably coupled to two of the rail elements.

9. The elevator car according to claim 1 wherein the linear guide means has a car guide element that movably couples the first car to the longitudinal support such that the first car is guided along the longitudinal support when the first support structure is moved.

10. The elevator car according to claim 1 wherein the first support structure supports the first car being a lower car and the second support structure supports the second car being an upper car.

11. The elevator car according to claim 1 wherein the drive means applies a lifting force to two diametrically opposed corner portions of the first support structure.

12. The elevator car according to claim 1 wherein the drive means includes a threaded spindle, a threaded nut slidably mounted on the threaded spindle and fastened to the first support structure, and a drive unit driving the threaded spindle.

13. A double-deck elevator comprising:

an elevator car according to claim 1; and a control device controlling the drive means of the elevator car based upon a floor distance between two floors to be approached at the same time by the elevator car.

14. A method for controlling the double-deck elevator according to claim 13, the method comprising the steps of:

receiving floor information regarding two floors to be approached at the same time by the elevator car;

evaluating the floor information and determining a floor distance between the two floors to be approached at the same time; and issuing a control command controlling the drive means of the elevator car based on the determined floor distance.

15. The method according to claim 14 wherein the first car is a lower car and the second car is an upper car and including further steps of issuing the control command to lower the lower car when the determined floor distance is greater than a previously determined floor distance, and issuing the control command to raise the lower car when the determined floor distance is smaller than the previously determined floor distance.

16. An elevator car for a double-deck elevator, wherein the elevator car has two cars arranged one above the other, wherein the cars are each accessible via a different floor in a stop position of the elevator car, the elevator car comprising:

an elevator car frame having four longitudinal supports extending in a longitudinal direction of the elevator car frame;

a first support structure arranged in the elevator car frame supporting a lower one of the cars;

a second support structure arranged in the elevator car frame supporting an upper one of the cars, where the second support structure and the second of the cars are fixed relative to the longitudinal support;

a linear guide means movably coupling the first support structure to the longitudinal supports wherein the first support structure is moveable along the longitudinal supports relative to the second support structure;

wherein the linear guide means has four rail elements each fastened to a different one the longitudinal supports and has two coupling elements slidably mounted on the rail elements and fastened to the first support structure;

wherein the coupling element has a first mounting portion and a second mounting portion mounting the coupling elements on the rail element, the coupling elements each having a fastening portion arranged between the first mounting portion and the second mounting portion and fastening the coupling element to the first support structure, wherein, in an operational state of the elevator car, the first mounting portion is arranged above the first support structure and the second mounting portion is arranged below the first support structure; and a drive means moving the first support structure relative to the second support structure.

17. The elevator car according to claim 16 wherein the coupling element has upper sliding guide shoes arranged in the first mounting portion and lower sliding guide shoes arranged in the second mounting portion for guiding the coupling element on the rail elements.

* * * * *